April 10, 1962 S. A. MURDOCK ETAL 3,029,220
GRAFT COPOLYMERS OF MONOMERIC AMINO-ETHYLACRYLATES AND
METHACRYLATES ON POLYVINYLLACTAMS, ACRYLONITRILE
POLYMER COMPOSITIONS OBTAINABLE THEREWITH, AND
METHOD OF PREPARATION
Filed Nov. 25, 1957

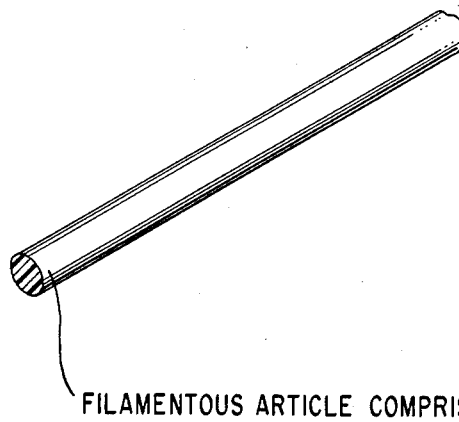

FILAMENTOUS ARTICLE COMPRISED OF AN ACRYLONITRILE POLYMER HAVING A GRAFT CO-POLYMER OF AN AMINOETHYLACRYLATE OR METHACRYLATE MONOMER GRAFT COPOLYMERIZED UPON A VINYL LACTAM POLYMER INCORPORATED THEREIN.

*INVENTORS.*
STANLEY A. MURDOCK
CLYDE W. DAVIS
FORREST A. EHLERS
BY *Griswold & Burdick*
ATTORNEYS

United States Patent Office 3,029,220
Patented Apr. 10, 1962

3,029,220
GRAFT COPOLYMERS OF MONOMERIC AMINO-
ETHYLACRYLATES AND METHACRYLATES ON
POLYVINYLLACTAMS, ACRYLONITRILE POLY-
MER COMPOSITIONS OBTAINABLE THERE-
WITH, AND METHOD OF PREPARATION
Stanley A. Murdock, Concord, Calif., Clyde W. Davis,
Williamsburg, Va., and Forrest A. Ehlers, Walnut
Creek, Calif., assignors to The Dow Chemical Com-
pany, Midland, Mich., a corporation of Delaware
Filed Nov. 25, 1957, Ser. No. 698,844
19 Claims. (Cl. 260—45.5)

The present invention resides in the general field of or-
ganic chemistry and contributes specifically to the poly-
mer art, especially with respect to graft copolymeric prod-
ucts particularly adapted for use in blend with fiber-form-
ing polymers. The invention is pertinent to the man-
made synthetic textile fiber industry. It is particularly
concerned with various graft copolymers of certain mono-
meric aminoethylacrylates or methacrylates on or with
polyvinyllactams that have especial utility as dye-recep-
tive, antistatic and stabilizing ingredients for acrylonitrile
polymer compositions which, advantageously, may be
of the fiber-forming variety. The invention is also con-
cerned with the compositions that may be obtained by
blending the graft copolymeric products with acrylonitrile
polymers, as well as the shaped articles which have been
fabricated therefrom that have significantly enhanced
properties and characteristics as regards improvements in
and relating to enhanced dye-receptivity, minimized in-
herent propensity to accumulate electrostatic charges and
an augmented natural stability to various deteriorating in-
fluences, including stability against becoming deleteriously
influenced and degraded upon exposure to heat at ele-
vated temperatures and light. Within the scope and pur-
view of the invention there is comprehended both the
novel and utile graft copolymer and blended polymer
compositions of the indicated varieties (as well as vari-
ous shaped articles fabricated therefrom and comprised
thereof) and advantageous methods for the preparation
of the several types of compositions that are contem-
plated.

It is the main purpose and primary design of the pres-
ent invention to provide and make available graft co-
polymeric products and blends of such products in acrylo-
nitrile polymer compositions, each of which are of the
above-indicated and hereinafter more fully delineated
types, and shaped articles from the graft copolymer-con-
taining acrylonitrile polymer compositions that have, as
intrinsic and distinguishing characteristics, excellent re-
ceptivity of and acceptability for any of a wide variety
of dyestuffs; permanently imbued antistatic properties that
are unusually good for and not commonly encountered
in polymeric materials of the synthetic, essentially hy-
drophobic varieties of such substances; and efficacious
natural stability to heat and light as well as to certain
chemical conditions such as alkaline environments.

The blended acrylonitrile polymer compositions of
the present invention which fulfill such ends and offer
corollary advantages and benefits, as will hereinafter be
manifest, are, in essence, comprised of an intimate and
practically inseparable blend or alloy constitution of (1)
an acrylonitrile polymer that contains in the polymer
molecule at least about 80 percent by weight of poly-
merized acrylonitrile which preferably is of the fiber-form-
ing variety and, most advantageously, is polyacrylonitrile
and (2) a minor proportion of a beneficial graft copoly-
meric additament, also a product of the invention, that
functions and serves simultaneously in the treble capacity
of a dye-assisting adjuvant, permanent antistatic agent
and stabilizer and which is comprised of the graft co-
polymerized polymerization product of (a) certain mono-
meric aminoethylacrylate or methacrylate compounds
with and upon, as a trunk or substrate in the graft copoly-
meric product, (b) a polymerized N-vinyl lactam, par-
ticularly poly-N-vinyl-2-pyrrolidone (PVP). The meth-
ods of the invention by which such compositions may
be made involve graft copolymerizing the monomers on
the polyvinyllactam substrate and incorporating the minor
proportions of the resulting graft copolymeric product as
an additament in and with the essential acrylonitrile poly-
mer base by any of several beneficial techniques, herein-
after more thoroughly defined, adapted to suitably accom-
plish the desired result.

Without being limited to or by the specific embodi-
ments and modes of operation set forth, the invention is
illustrated in and by the following docent examples where-
in, unless otherwise indicated, all parts and percentages
are to be taken on a weight basis.

Example A

A polymeric additament satisfactory for use in prac-
tice of the present invention was prepared by charging
into a suitable reaction vessel about 3.0 grams of the
monomeric hydrochloride of 2-aminoethylmethacrylate
(AEMA·HCl); about 7.0 grams of PVP having a
Fikentscher K-value of about 57; about 0.2 gram of
potassium persulfate; and about 40.6 grams of water.
The charge, after being mixed together, had a pH of
about 6. The charge was polymerized under an at-
mosphere of nitrogen at a temperature of about 50° C.
with continued agitation for a period of about 16 hours.
About 92.1 percent of the monomer was converted to a
graft copolymer product with the PVP which contained
about 28 percent of polymerized AEMA·HCl; and about
72 percent of PVP. The graft copolymerized polymeric
additament was obtained from the reaction mass as a
solution of the graft copolymer in water containing about
19.5 percent of dissolved polymer solids.

Polyacrylonitrile fibers containing about 10 percent of
the above polymeric product were prepared by impreg-
nating filamentary structures that were in aquagel condi-
tion after having been salt-spun and wet-stretched in and
with an aqueous solution of the graft copolymer that con-
tained about 5 percent of dissolved graft copolymer solids.
The polyacrylonitrile aquagel fiber that was employed had
been obtained by extruding a spinning solution of fiber-
forming polyacrylonitrile comprised of about 10 parts
of the polymer dissolved in 90 parts of a 60 percent
aqueous solution of zinc chloride through a spinnerette
having 750 individual 6 mil diameter orifices into an
aqueous coagulating bath that contained about 42 per-
cent of dissolved zinc chloride to form a multiple filament
tow. After being spun, the tow bundle of coagulated poly-
acrylonitrile aquagel fiber was washed substantially free
from salt upon being withdrawn from the coagulating bath
and then wet-stretched for orientation to a total stretched
length that was about thirteen times its original extruded
length. The aquagel fiber was then passed through the
mentioned aqueous impregnating bath of the dispersed
polymeric additive so as to become impregnated therewith
to the indicated extent.

Following the impregnation, the aquagel fiber was ir-
reversibly dried at 150° C. to destroy the water-hydrated
structure and convert it to a finished fiber form. The
finally obtained 3 denier fiber product had a tenacity
of about 4.0 grams per denier, an elongation of about
30 percent and a wet yield strength of about 0.85 gram
per denier. The graft copolymer-containing acrylonitrile
polymer fiber product was found to have excellent nat-
ural stability to heat and light as well as against becom-
ing degraded under the influence of aqueous alkaline
media at pH levels as high as 10. It was found to be nearly free of propensity to accumulate charges of static electricity upon handling.

The graft-copolymer-impregnated fiber product dyed well to deep and level shades of coloration with Calcodur Pink 2BL, a direct type of dyestuff (Colour Index 353).

The dyeing with Calcodur Pink 2BL was performed at the 4 percent level according to conventional procedure in which the fiber sample was maintained for about one hour at the boil in the dyebath which contained the dyestuff in an amount equal to about 4 percent of the weight of the fiber. The dyebath also contained sodium sulfate in an amount equal to about 15 percent of the weight of the fiber and had a bath-to-fiber weight ratio of about 30:1. After being dyed, the fiber was rinsed in water and dried for about 20 minutes at 80° C. The dye-receptivity of the Calcodur Pink 2BL-dyed fiber was then evaluated spectrophotometrically by measuring the amount of monochromatic light having a wave length of about 520 millimicrons from a standard source that was reflected from the dyed sample. A numerical value on an arbitrarily designated scale from zero to one hundred was thereby obtained. This value represented the relative comparison of the amount of light that was reflected from a standard white tile reflector that had a reflectance value of 316 by extrapolation from the 0–100 scale. Lower reflectance values are an indication of better dye-receptivity in the fiber. For example, a reflectance value of about 20 or 25 to 50 or so for acrylonitrile polymer fibers dyed with 4 percent Calcodur Pink 2BL is generally considered by those skilled in the art to be representative of a degree of dye-receptivity that readily meets or exceeds the most rigorous practical requirements and is ordinarily assured of receiving general commercial acceptance and approval. The Calcodur Pink 2BL-dyed polyacrylonitrile fibers containing the above-described polymeric additament in accordance with the invention had a reflectance value of about 11. In contrast, ordinary unmodified polyacrylonitrile fibers of the same type generally have a reflectance value of about 130 on the same numerical scale.

When the graft copolymer-containing fiber was heated for 45 minutes at a temperature of 150° C., it showed no evidence of discoloration. By way of comparison, an unmodified polyacrylonitrile fiber prepared in the same way developed a light yellow shade of coloration when subjected to the same thermal exposure.

In addition, the graft-copolymer-containing fiber sample, even after being severely scoured, had antistatic characteristics much superior to ordinary polyacrylonitrile fibers and only slightly poorer than cotton. At the same time, the physical properties of the graft-copolymer-containing fiber were excellent, being about equal to those of unmodified polyacrylonitrile fibers.

Equivalent results are obtained when the foregoing procedure is repeated excepting to impregnate the aquagel fiber with the copolymer additive prior to the stretch-drawing operation on the fiber.

*Example B*

Following the general procedure of Example "A" about 3.0 grams of dimethylaminoethylacrylate (DMAEA); about 7.0 grams of PVP having a Fikentscher K-value of 57; about 0.2 gram of ammonium persulfate and about 40.6 grams of water were mixed together and the pH of the resulting mixture adjusted to a value of about 5 with HCl. The charge was polymerized for about 16 hours at 50° C. under a nitrogen atmosphere with continued agitation throughout the entire period of polymerization. Practically all (i.e., about 93.4 percent) of the monomer was converted to a water-insoluble graft copolymer product which was obtained in the form of a uniform, milky aqueous dispersion. The graft copolymer product contained about 29 percent of the polymerized DMAEA and about 71 percent of the PVP. The dispersion was applied to a polyacrylonitrile aquagel fiber by a method in accordance with that set forth in the first example using a 5 percent aqueous dispersion of the graft-copolymer as an impregnating bath. The impregnated fiber was found to contain about 12 percent of the graft-copolymer product. The impregnated fiber product was readily dyeable. Its Calcodur Pink 2BL reflectance value was 9. It had low static properties and excellent stability to heat, light and alkaline media at pH levels as high as 10.

*Example C*

The procedure of Example "B" was essentially duplicated excepting to employ a graft copolymeric polymer additament which was a graft copolymer of diethylaminoethylacrylate (DEAEA) on PVP prepared from the following polymerization mass which was polymerized under the same conditions and in the same way as that of the preceding example:

| | Grams |
|---|---|
| DEAEA | 3.0 |
| PVP (Fikentscher K-value 57) | 7.0 |
| Potassium persulfate | 0.2 |
| Water | 40.6 |

The pH was adjusted to 5 with HCl and then polymerized at 50° C. for 16 hours. Conversion of the monomer to graft-copolymer product was about 88.7 percent. The graft copolymer was obtained as a slightly colored aqueous solution containing about 20 percent of polymeric solids.

Polyacrylonitrile aquagel fibers were impregnated in the same way as set forth in the preceding examples from a 3 percent aqueous solution of the graft-copolymer product so as to contain, upon being dried and converted to finished fiber form, about 10 percent of the impregnated graft copolymer, based on the weight of the fiber. The resulting graft copolymer-containing fiber product was readily dyeable. Its Calcodur Pink 2BL reflectance value was about 12. Its heat stability was excellent. After 20 minutes of exposure at 150° C., the graft copolymer-containing fiber product developed a hardly discernible discoloration. In contrast, both a similarly prepared, but completely unmodified, polyacrylonitrile fiber and another of the same type that contained about 10 percent of K-45 PVP as a dye-assisting homopolymeric adjuvant turned to a quite noticeable shade of yellow coloration under the same thermal test. Furthermore, even after being severely scoured, the graft copolymer-containing fiber sample had electrical conductance properties much superior to ordinary polyacrylonitrile fibers and only slightly poorer than cotton. At the same time, the physical properties of the graft copolymer-containing fibers were excellent, being about equal to those of the unmodified polyacrylonitrile fiber.

*Example D*

About 3.0 grams of dimethylaminoethylmethacrylate; 7.0 grams of PVP having a Fikentscher K-value of about 57; 40.6 grams of water and 0.2 gram of potassium persulfate were mixed together. The pH of the resulting mixture was adjusted to 5 with HCl. The thereby-obtained polymerization mass was heated under a nitrogen atmosphere with continued agitation for a period of about 16 hours at a temperature of about 50° C. during which time conversion of the monomers to graft copolymer product was substantially complete, being about 91 percent. A water-soluble graft-copolymer product was thereby obtained which was found to contain about 28 percent of the polymerized dimethylaminoethylmethacrylate and about 72 percent of PVP. The aqueous product contained about 20 percent of graft copolymeric solids. When the graft copolymeric polymer additament was impregnated from a 3 percent aqueous dispersion into polyacrylonitrile aquagel fibers according to the foregoing procedures, so as to obtain a fiber product with an impregnated graft-copolymer content of about 12 percent, a readily dyeable fiber product was obtained which, when dyed with 4 percent Calcodur Pink 2BL was found to have a reflectance value of about 11. The antistatic characteristics of the graft copolymer-containing fiber product were about commensurate with those of cotton. The resulting fiber product also had excellent heat, light and alkaline stability. To illustrate, upon 20 minutes exposure at 150° C. only slight discoloration occurred in the fiber product. Besides, its physical properties were very good, being comparable to those of unmodified polyacrylonitrile fibers of the same type.

Results similar to those above can be achieved with other graft copolymers within the scope of the invention, preparing them from other monomers of the subsequent Formula I and poly-N-vinyl-2-pyrrolidone and other polyvinyllactams.

Results similar to those set forth in the foregoing can also be obtained when the polymeric additaments are incorporated in polyacrylonitrile and other acrylonitrile polymer fibers that contain in the polymer molecule at least about 80 percent by weight of acrylonitrile to provide articles in accordance with the present invention by blending the polymeric additament and the fiber-forming acrylonitrile polymer in a spinning composition or dope prior to its extrusion and to filamentary products by either wet-spinning or dry-spinning techniques. In such instances, incidentally, it may be desirable in order to secure optimum benefit in the practice of the invention to employ relatively larger quantities of the copolymeric additament than when surface impregnation is performed so that the presence of effective quantities of the additament at or near the surface of the article is assured. Excellent results may also be achieved when other poly-N-vinyllactams, including poly-N-vinylcaprolactam, poly-N-vinylpiperidone, and poly-N-vinyl-5-methyl-2-pyrrolidone are substituted for or mixed with the PVP in the preparation of the polymeric additaments.

The polymeric additaments that are employed in the practice of the invention, as is indicated in the foregoing, are graft copolymerized products upon (b) poly-N-vinyllactam substrates of (a) monomeric aminoethylacrylates and methacrylates of the general formula and structure:

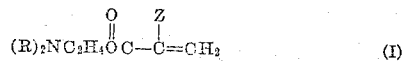

wherein each R is independently selected from the group consisting of hydrogen, methyl radicals and ethyl radicals and Z is hydrogen or methyl. Included among the several aminoethylacrylate monomers that may be employed suitably are the following: 2-aminoethylacrylate; 2-aminoethylmethacrylate; 2-methylaminoethylacrylate; 2-methylaminoethylmethacrylate; 2-dimethylaminoethylacrylate; 2-dimethylaminoethylmethacrylate; 2-ethylaminoethylacrylate; 2-ethylaminoethylmethacrylate; 2-diethylaminoethylacrylate; 2-diethylaminoethylmethacrylate; 2-methylethylaminoethylacrylate; and 2-methylethylaminoethylmethacrylate. As is appreciated by those skilled in the art, the acrylate monomers, as well as copolymers formed therefrom, are normally present as acid salts in solutions or other dispersions in which the pH is about 6 or less. Thus, hydrochloride salts are present in hydrochloric acid solutions or in dispersions of the acrylate monomers or their polymeric products in hydrochloric acid. These acid salts are freely and reversibly formed and dissociated, depending upon the medium in which the acrylate exists. The dissociated forms of such salts should not be considered as entities that are unique from their corresponding undissociated forms.

Any of the vinyl lactam polymers besides the advantageous mentioned species (i.e., poly-N-vinyl-2-pyrrolidone, poly-N-vinylcaprolactam, poly-N-vinyl-5-methyl-2-pyrrolidone and poly-N-vinylpiperidone) may be employed suitably for the preparation of the graft copolymeric additives of the present invention. Such polymers are generally well known to the art. They have been described and are involved, for example, in United States Letters Patent No. 2,265,450. While the exact K-value of the vinyl lactam polymer that is employed is not absolute or especially critical, it is sometimes beneficial to utilize those having K-values from about 25 to 60 although products having other K-values are also generally satisfactory to employ.

The graft copolymeric additaments that are employed in the practice of the invention may generally be prepared by various methods of polymerization, including those which have been demonstrated in the foregoing illustrative examples. The graft copolymer products may be either water-soluble or water-insoluble, depending upon their specific compositions. In either event, the graft copolymers are readily dispersible in aqueous and other liquid media. In addition to the usual catalysts, including persulfates, organic and inorganic peroxides and azo type catalysts, the graft-copolymers may oftentimes be polymerized under the influence of high energy radiation such as by means of X-rays and the like, or simply by heating and evaporating the monomer-containing polymerization mixture. The graft-copolymers may be prepared in both aqueous and organic solvent vehicles, using temperatures for the desired polymerization that may vary from about room temperature to the boiling point of the polymerization mixture. It is ordinarily satisfactory to conduct the reaction at a temperature of about 50 to 80 or 100° C. Usually, depending upon the specific factors that may be involved, the copolymerization may be accomplished satisfactorily within a time period of about 10 to 60 hours.

The compositions of the graft copolymerized polymeric additament can vary within rather wide limits. Advantageously, the content of the poly-N-vinyl lactam upon which the monomeric aminoacrylates are graft copolymerized is between about 20 and 80 percent of the weight of the graft copolymerized product. It may frequently be desirable for the monomeric constituent that is polymerized to be employed in nearly equivalent or about commensurate or equal weight proportions with the vinyl lactam polymer trunk in the preparation of the graft copolymeric polymeric additament.

The polymerization system that is employed for the preparation of the copolymers employed in the present invention may consist of as much as 50 percent by weight of the monomer and poly-N-vinyllactam to be graft-copolymerized in the aqueous medium. The amount of monomeric material that is provided in the copolymerization system may be influenced somewhat by the manner in which it is intended to incorporate the product in the synthetic polymer compositions in order to provide the compositions of the invention.

If, for example, it is intended to incorporate the graft copolymer products by blending into a fiber-forming composition prior to its fabrication into shaped articles, the copolymerization system may, if desired contain about equal proportions by weight of the charged monomeric and polymeric materials and the polymerization medium which preferably is miscible with and tolerable in the spinning solution solvent being used. In such cases, the copolymer product may ordinarily be obtained as a soluble product or as an easily dispersed gel that, after being dried and isolated from unreacted monomer, may readily be directly incorporated in the fiber-forming composition.

If the incorporation of the graft copolymeric additament in a fiber-forming composition is to be achieved by impregnation therewith of an already-formed shaped article of the composition, it may be desirable to effect the polymerization so as to directly form the polymerization system as a suitable applicating solution or as an emulsion or suspension of the copolymeric product. For such purposes, the polymerization system may be prepared to contain as little as 2 or 10 percent by weight of the graft copolymerizing ingredients. Preferably, if a water-insoluble graft copolymer is being made, such a polymerization may be conducted under the influence of vigorous agitation to facilitate preparation of an emulsified or thoroughly dispersed product. It may also be beneficial under such circumstances to incorporate a dispersant or emulsifying agent in the polymerization system to facilitate obtaining a stable and homogeneous emulsified product. Such a method for preparing the graft copolymeric additaments that are employed in the present invention may be especially appropriate when they are intended to be applied to acrylonitrile polymer fibers and the like that are derived from aquagels in the course of their manufacture, such as the acrylonitrile polymer fibers that are wet spun from aqueous saline solutions of the fiber-forming polymer.

In such instances, as has been demonstrated, the graft copolymeric additaments, in either solution or dispersion form, may be impregnated into the fiber while it is in a swollen or gel condition, as an acrylonitrile polymer fiber in an aquagel condition, in order to obtain the desired graft copolymer-containing product.

In this connection, when it is desired to blend the polymeric additament in a synthetic polymer fiber-forming solution prior to its extrusion, such as an aqueous saline acrylonitrile polymer solution, the graft copolymer may be physically reduced by comminution to a sufficiently fine state to permit its dispersion in spinnable condition throughout the blended spinning solution in the event that it is otherwise insoluble in the solvent. While this may be accomplished by diverse techniques, it is generally advantageous under such circumstances to comminute the polymeric additament in the presence of the non-dissolving solvent, such as an aqueous saline polyacrylonitrile solvent, to form a stable suspension that may be more conveniently blended with the spinning solution of the synthetic polymer, such as an aqueous saline acrylonitrile polymer spinning solution. Thus, if the aqueous saline polyacrylonitrile solvent that is being employed is an aqueous solution of zinc chloride or its equivalent that contains at least about 55 percent and preferably about 60 percent by weight of dissolved zinc chloride, it may be advantageous to comminute a water-insoluble graft copolymeric additament while it is in a mixture with the saline solvent solution that contains between about 5 and 10 percent by weight of the copolymer. Analogous procedures may be employed when other solvents are involved. Ball or rod mills or other attrition apparatus may be employed beneficially for the comminution. It is generally beneficial under such circumstances to avoid the use of balls or rods that are made of metal since they may contaminate the product, especially when aqueous saline solvents are utilized. Porcelain or other ceramic parts may usually be employed with advantage. A stable suspension of a water-insoluble graft copolymeric additament in the acrylonitrile polymer solvent that is suitable for blending in the spinning solution of the acrylonitrile polymer to provide a spinnable composition may usually be obtained by milling the mixture of polymeric additament and solvent for an extended period that may exceed 100 hours. The suspension that is thereby obtained may then be directly blended in the proper proportions with the acrylonitrile polymer spinning solution to provide a composition in accordance with the present invention. Of course, water-soluble graft copolymeric additaments are generally capable of being directly dissolved in such aqueous saline solvents.

If desired, the graft copolymer-containing acrylonitrile polymer compositions may comprise as much as 20 or more percent by weight of the graft copolymeric additament, based on the weight of the composition. Usually, however, suitable properties and characteristics and better fiber-forming properties in a given composition may be achieved when lesser proportions of the polymeric additament are incorporated therein. An appreciable improvement in dye-receptivity, antistatic properties and stability may frequently be obtained when a quantity of the graft copolymeric additament that is less than 1 percent by weight is employed. Advantageously, an amount between about 4 and 15 percent by weight of the graft copolymeric additament may thus be utilized in the composition. Greater advantages may often accrue when the amount of the polymeric additament that is incorporated in the composition is in the neighborhood of 5–10 percent by weight, based on the weight of the composition.

As has been indicated, the graft copolymeric additaments may be incorporated in the acrylonitrile polymer compositions according to various techniques. Thus, for example, the polymeric additament and the acrylonitrile polymer may be directly blended in order to provide the composition which, incidentally, may be used for any desired fabrication purpose in addition to fiber-forming and the like. Beneficially, the polymers may be comminuted, either separately or in combination, before being intimately blended together by mechanical or other means. The blended polymers may be prepared into suitable fiber-forming systems by dissolving or dispersing them in a suitable liquid medium. Or, the compositions may be provided in fiber-forming system by sequentially dissolving or dispersing the polymers in any desired order in a suitable medium, as by incorporating the polymeric additament in a prepared acrylonitrile polymer spinning solution, dope or the like. As is obvious, the polymeric additaments employed in the practice of the present invention are readily or soluble or dispersible in most solvents.

As is evident from the illustrative examples heretofore included, a highly advantageous technique for providing the compositions, particularly when acrylonitrile polymer fiber products are involved, is to apply or impregnate the graft copolymeric additament from an aqueous solution or dispersion thereof to a shaped acrylonitrile polymer article that is in an aquagel condition in a manner similar and analogous to that employed for the impregnation of vinyl lactam polymers as described in the disclosure contained in the copending application of George W. Stanton, Theodore B. Lefferdink, Richard W. Meikle and Mary J. Charlesworth for a "Method and Composition For Rendering Polyacrylonitrile Readily Dyeable" having Serial No. 333,385 which was filed on January 26, 1953, now abandoned. Thus, an acrylonitrile polymer filamentary article that has been spun from an aqueous saline spinning solution may be conveniently passed, after its coagulation and while it is in an aquagel condition, through a water bath containing a dissolved or dispersed graft copolymeric additament in order to impregnate the filament with the graft-copolymer and provide a composition and an article in accordance with the invention. In addition, the graft copolymeric additaments may be provided by in situ polymerization of the graft copolymerizing constituents in a shaped article of the acrylonitrile polymer base. Thus, the acrylonitrile polymer, such as polyacrylonitrile aquagel, may be impregnated with suitable proportions of the vinyl lactam polymer and the aminoacrylate monomer and the graft copolymer formed in situ by accomplishing the graft copolymerization with impregnated chemical catalysts using dry or steam heat or with high energy radiation.

The compositions of the invention may advantageously be utilized in or with fiber-forming systems of any desired type in order to provide fibers and the like according to procedures and techniques that are conventionally employed for such purposes in the preparation of fibers and such related shaped articles as filaments, strands, yarns, tows, threads, cords and other funicular structures, ribbons, tapes, films, foils, sheets and the like which may be manufactured from synthetic polymeric materials. It is frequently desirable to employ concentrated solutions of salts of mixtures of salts as the dispersing or dissolving media for such purposes. Such solutions may, as has been indicated, contain at least about 55 percent by weight, based on the weight of the solution, of zinc chloride or other known saline solvents for the polymer. Acrylonitrile polymer fiber products that are spun from saline fiber-forming systems may, by way of further illustration, be coagulated in more dilute saline solutions of a like or similar nature and may then be processed after coagulation according to conventional techniques of washing, stretching, drying, finishing and the like with the modification of the present invention being accomplished prior or subsequent to the spinning as may be desired and suitable in particular instances.

The acrylonitrile polymer fiber products in accordance with the present invention (one of which is schematically illustrated in the sole figure of the accompanying drawing) have excellent physical properties and other desirable characteristics for a textile material and have a high capacity for and are readily and satisfactorily dyeable to deep and level shades with any of a wide variety of dyestuffs. For example, they may be easily and successfully dyed according to conventional procedures using acid, vat, acetate, direct, naphthol and sulfur dyes. Such dyestuffs, by way of didactic illustration, as Calcocid Alizarine Violet (Colour Index 61710, formerly Colour Index 1080), Sulfanthrene Red 3B (Colour Index Vat Violet 2), Amacel Scarlet GB (Colour Index 11110 and Direct Red 1—also known as Amacel Scarlet BS, and having American Prototype Number 244), Calcodur Pink 2BL (Colour Index 353, also more recently, Colour Index Direct Red 75), Naphthol ASMX (Colour Index 35527), Fast Red TRN Salt (Colour Index Azoic Diazo Component 11), and Immedial Bordeaux G, (Colour Index Sulfur Brown 12) may advantageously be employed for such purposes.

Other dyestuffs, by way of further illustration, that may be utilized beneficially on the graft copolymer-containing, polymer blended fiber products of the invention include such direct cotton dyes as Chlorantine Fast Green 5BLL (Colour Index Direct Green 27), Chlorantine Fast Red 7B (Colour Index Direct Red 81), Pontamine Green GX Conc. 125 percent (Colour Index Direct Green 6), Calcomine Black EXN Conc. (Colour Index Direct Black 38), Niagara Blue NR (Colour Index Direct Blue 151) and Erie Fast Scarlet 4BA (Colour Index Direct Red 24); such acid dyes as Anthraquinone Green GN (Colour Index Acid Green 25), Sulfonine Brown 2R (Colour Index Acid Orange 51), Sulfonine Yellow 2G (Colour Index Acid Yellow 40), Xylene Milling Black 2B (Colour Index Acid Black 26A), Xylene Milling Blue FF (Colour Index Acid Blue 61), Xylene Fast Rubine 3GP PAT (Colour Index Acid Red 57), Calcocid Navy Blue R Conc. (Colour Index Acid Blue 120), Calcocid Fast Blue BL (Colour Index Fast Blue 59), Calcocid Milling Red 3R (Colour Index Acid Red 151), Alizarine Levelling Blue 2R (Colour Index Acid Blue 51), Amacid Azo Yellow G Extra (Colour Index Acid Yellow 63); such mordant-acid dyes as Alizarine Light Green GS (Colour Index Acid Green 25); such basic dyes as Brilliant Green Crystals (Colour Index Basic Green 1) and Rhodamine B Extra S (Colour Index Vat Blue 35); such vat dyestuffs as Midland Vat Blue R Powder (Colour Index Vat Blue 35), Sulfanthrene Brown G Paste (Colour Index Vat Brown 5), Sulfanthrene Blue 2B Dbl. paste (Colour Index Vat Blue 5), and Sulfanthrene Red 3B paste (Colour Index Vat Violet 2); various soluble vat dyestuffs; such acetate dyes as Celliton Fast Brown 3RA Extra CF (Colour Index Dispersed Red 13), Artisil Direct Red 3BP and Celanthrene Pure Blue BRS 400 percent (Colour Index Dispersed Blue 1) and Acetamine Yellow N (Colour Index Dispersed Yellow 32); B-Naphthol←2-chloro-4-nitroaniline, and azoic dye; such sulfur dyes as Katigen Brilliant Blue GGS High Conc. (Colour Index Sulf. Blue 9) and Indo Carbon CLGS (Colour Index Sulf. Blue 6); and various premetallized dyestuffs.

The dyed products are generally lightfast and stable to heat and are well imbued with a resistance to crocking. In addition, the dyed products exhibit good washfastness and retain the dye-assisting polymeric additament in a substantially permanent manner despite repeated exposure and subjection to washing, laundering and dry cleaning treatments.

What is claimed is:

1. Graft copolymer comprising between about 20 and 80 percent by weight of (a) a monomeric aminoethylacrylate compound of the formula:

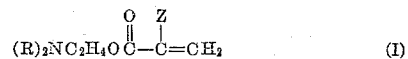

wherein each R is independently selected from the group consisting of hydrogen, methyl and ethyl and Z is selected from the group consisting of hydrogen and methyl; and (b) from about 80 to 20 percent by weight of an N-vinyl lactam polymer.

2. The graft copolymer of claim 1 containing in the polymer molecule about equal proportions of graft copolymerized units of said monomer of Formula I and said N-vinyl lactam polymer.

3. The graft copolymer of claim 1, wherein said N-vinyl lactam polymer with which said monomeric aminoethylacrylate compound is draft copolymerized is poly-N-vinyl-2-pyrrolidone.

4. Method for the preparation of a graft copolymer which comprises polymerizing between about 20 and 80 percent by weight, based on the weight of the resulting graft copolymer, of a monomeric aminoethylacrylate compound of the formula:

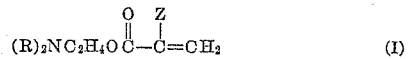

wherein each R is independently selected from the group consisting of hydrogen, methyl and ethyl and Z is selected from the group consisting of hydrogen and methyl; with between about 80 and 20 percent by weight of an N-vinyl lactam polymer.

5. Composition comprising a major proportion of (1) a fiber forming polymer of an ethylenically unsaturated monomeric material containing at least about 80 percent by weight of acrylonitrile and (2) a minor proportion of up to about 20 percent by weight, based on the weight of the composition, of a graft copolymer of (a) from about 20 to 80 percent by weight, based on the weight of the graft copolymer, of a monomeric aminoethylacrylate compound of the formula:

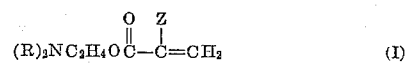

wherein each R is independently selected from the group consisting of hydrogen, methyl and ethyl and Z is selected from the group consisting of hydrogen and methyl; and from about 80 to 20 percent by weight of a poly-N-vinyl-lactam.

6. The composition of claim 5 containing between about 4 and 15 percent by weight, based on the weight of the composition, of said graft copolymer.

7. The composition of claim 5, wherein component (2) contains about 50 percent by weight of said poly-N-vinyl lactam, based on the weight of said graft copolymer.

8. The composition of claim 5, wherein component (2) is a graft copolymer of 2-aminoethylmethacrylate on poly-N-vinyl-2-pyrrolidone.

9. The composition of claim 5, wherein component (2) is a graft copolymer of dimethylaminoethylacrylate on poly-N-vinyl-2-pyrrolidone.

10. The composition of claim 5, wherein component (2) is a graft copolymer of diethylaminoethylmethacrylate on poly-N-vinyl-2-pyrrolidone.

11. The composition of claim 5, wherein component (2) is a graft copolymer of diethylaminoethylacrylate on poly-N-vinyl-2-pyrrolidone.

12. The composition of claim 5, wherein component (2) is a graft copolymer of dimethylaminoethylmethacrylate on poly-N-vinyl-2-pyrrolidone.

13. The composition of claim 5, wherein the acrylonitrile polymer is polyacrylonitrile.

14. The composition of claim 5 dissolved in a solvent for polyacrylonitrile.

15. A filamentary shaped article comprised of a composition that is set forth in claim 5.

16. Method for the preparation of a dye-receptive, antistatic, stable to light and heat, synthetic, hydrophobic polymer composition which comprises immersing an aquagel of a fiber forming polymer of an ethylenically unsaturated monomeric material containing at least about 80 percent by weight of acrylonitrile in the form of a shaped article into a dispersion of a graft copolymer of (a) from about 20 to 80 percent by weight of a monomeric aminoethylacrylate compound of the formula:

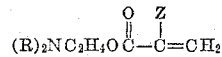  (I)

wherein each R is independently selected from the group consisting of hydrogen, methyl and ethyl and Z is selected from the group consisting of hydrogen and methyl; and (b) between about 20 and 80 percent by weight of a poly-N-vinyl lactam, until between about 1 and 20 percent by weight of said graft copolymer, based on the weight of the resulting dry composition weight, is incorporated in said aquagel; and drying said graft copolymer-containing aquagel to convert it from the aquagel condition to a finished shaped article form.

17. The method of claim 16, wherein said acrylonitrile polymer is polyacrylonitrile.

18. The method of claim 16, wherein said poly-N-vinyl lactam is poly-N-vinyl-2-pyrrolidone.

19. The method of claim 16, wherein said shaped article is prepared in filamentary form.

References Cited in the file of this patent

UNITED STATES PATENTS

| | | |
|---|---|---|
| 2,120,933 | Dittmar | June 14, 1938 |
| 2,417,312 | MacGregor | Mar. 11, 1947 |
| 2,418,696 | Cameron et al. | Apr. 8, 1947 |
| 2,614,289 | Cresswell et al. | Oct. 21, 1952 |
| 2,643,990 | Ham | June 30, 1953 |
| 2,735,831 | Coover | Feb. 21, 1956 |
| 2,776,270 | Coover et al. | Jan. 1, 1957 |
| 2,776,271 | Coover et al. | Jan. 1, 1957 |
| 2,790,783 | Coover | Apr. 30, 1957 |
| 2,821,519 | Glickman | Jan. 28, 1958 |
| 2,837,496 | Vandenberg | June 3, 1958 |

FOREIGN PATENTS

| | | |
|---|---|---|
| 715,194 | Great Britain | Sept. 8, 1954 |
| 801,746 | Germany | Jan. 22, 1951 |